US012613906B2

(12) United States Patent　　　　　(10) Patent No.:　US 12,613,906 B2
Vu et al.　　　　　　　　　　　　　　(45) Date of Patent: 　　　Apr. 28, 2026

(54) HIGH-SPEED SEARCH MATCHING METHOD FOR LARGE-SCALE HETEROGENEOUS DATABASES

(71) Applicant: VIETTEL GROUP, Ha Noi City (VN)

(72) Inventors: Duc Chinh Vu, Ha Noi City (VN); Van Bang Le, Ha Noi City (VN); Hoang Nam Nguyen, Ha Noi City (VN); Huy Hoang Truong, Van Lam District (VN)

(73) Assignee: VIETTEL GROUP, Ha Noi City (VN)

( * ) Notice: Subject to any disclaimer, the term of this patent is extended or adjusted under 35 U.S.C. 154(b) by 0 days.

(21) Appl. No.: 18/924,366

(22) Filed: Oct. 23, 2024

(65) Prior Publication Data

US 2025/0156472 A1　　May 15, 2025

(30) Foreign Application Priority Data

Nov. 15, 2023　　(VN) ............................... 1-2023-08082

(51) Int. Cl.
| | |
|---|---|
| *G06F 16/535* | (2019.01) |
| *G06F 16/532* | (2019.01) |
| *G06V 10/75* | (2022.01) |
| *G06V 10/77* | (2022.01) |
| *G06V 20/70* | (2022.01) |
| *G06V 30/30* | (2022.01) |
| *G06V 40/16* | (2022.01) |

(52) U.S. Cl.
CPC .......... *G06F 16/535* (2019.01); *G06F 16/532* (2019.01); *G06V 10/751* (2022.01); *G06V 10/7715* (2022.01); *G06V 20/70* (2022.01);

*G06V 30/30* (2022.01); *G06V 40/168* (2022.01); *G06V 2201/08* (2022.01)

(58) Field of Classification Search
CPC .................................. G06F 16/26; G06F 16/28
USPC .......................................................... 707/705
See application file for complete search history.

(56) References Cited

U.S. PATENT DOCUMENTS

| | | | |
|---|---|---|---|
| 2015/0055891 A1* | 2/2015 | Hirakawa | ............. G06F 16/583 |
| | | | 382/306 |
| 2016/0196467 A1* | 7/2016 | Xia | ...................... G06V 40/172 |
| | | | 382/118 |

* cited by examiner

*Primary Examiner* — Baoquoc N To
(74) *Attorney, Agent, or Firm* — patenttm.us

(57) ABSTRACT

The high-speed search matching method with a large-scale heterogeneous database includes the process of extracting and storing the user's registered image features, forming a database, and being a reference when matching and searching; The process of initializing the search engine, in which two objects in the search engine are initialized, including a matching object, calculating the distance, and a data table object to determine the target search object for each input image sample; The process of matching and searching for objects, including the process of calculating the distance between the features and determining the target array, and finally comparing and returning the final result. The proposed method has demonstrated the ability to calculate accurately as well as very high performance, especially in large-scale data processing cases.

8 Claims, 4 Drawing Sheets

HIGH-SPEED SEARCH MATCHING METHOD FOR LARGE-SCALE HETEROGENEOUS DATABASES

TECHNICAL FIELD COVERED

The invention covers a high-speed search matching method for large-scale heterogeneous databases. Specifically, the high-speed search matching method for large-scale heterogeneous databases is applied in the fields of artificial intelligence and computer vision, aiding to process and search for objects in object recognition problems.

BACKGROUND OF THE INVENTION

For small systems, such as those used to recognize faces for personnel entering and leaving a certain building, the database has high homogeneity, which is data belonging to only one unit with a single service provider. Normally, in this case, the search matching method is still to calculate the distances between the available database and the facial features appearing in front of the camera, the samples identified as matched ones are those with low feature distances.

For small systems with small data scale and high homogeneity, the role of search engines is not high, and the operating time of search operators is also small and insignificant, because only a single calculation is performed for one (or a group of) features. In addition, due to the small data scale, there are many approaches when calculating distances, even for edge processing devices, it is possible to use a cyclic calculation method (using Java or C++ programming languages) while still ensuring the calculation time is within the acceptable range.

However, in the case of an application that operates a cloud-based object recognition service for a large scale of service providers (third parties), large users, flexible installation locations, and large databases, the search data arrays for each image sample that needs to be recognized are different, for example, a user owns two buildings, each building will have a different database, when there is an object standing in front of the camera, it only needs to search the database array of that building, without getting matching results for the rest of the database.

BRIEF SUMMARY OF THE INVENTION

The purpose of the invention is to overcome the existing technical problems, improve the performance in the search matching process and be flexible when searched simultaneously many groups of data, in order to recognize objects in images by the comparison method, calculating distance, by proposing a high-speed search matching method with a large-scale mixed database. The method in the invention also helps to process flexibly on devices with different configurations.

In this invention, the high-speed search matching method with a large-scale mixed database is implemented based on the following processes:

Registration image processing process: used to extract the features of the object (can be a face, or a person's shape, a vehicle) and update, store into the database according to the fragmented structure of rows and columns.

The search engine initialization process: performs the process of reading the database, including loading the feature data and accompanying information, and packaging it into two objects, the first is the matrix-matching object and the second is the data-table object. These two objects constitute the search engine, and perform the tasks of determining the target data array as well as determining the distance between the image features to be searched and the feature matrix of the available database.

The search implementation process (the cluster of operators that operate the search engine): includes extracting features from the image to be matched, searching, and performing queries, comparing with the available database, finding the most matching data patterns (with the smallest distance).

DETAILED DESCRIPTION OF THE INVENTION

To solve the problem of searching for matches for recognition, there are usually two common approaches:

One is to initialize individual data arrays into different search objects.

Two is to generally match on the entire data block, then determine the target array of each image sample, the calculated distance result and the matching will only use that data array.

For the first method, to coordinate each image sample (or a group of images) into each separately initialized search object will take a lot of time. In addition, the data array combinations will cause overlap in object storage, causing waste of resources.

The second method takes advantage of the block-based computing capacity of available tools such as Numpy, Cupy . . . to speed up distance calculation, at the same time, relies on the analysis method according to the data table to mark the target array for each sample to be searched. This is also the basis for parallel design of two objects in the search engine in this invention.

Setting the requirements of the search engine in the case of operating with a complex and large-scale database, the invention proposes a high-speed search matching method with a large-scale mixed database, ensuring accurate search and optimal performance.

Figure 1:
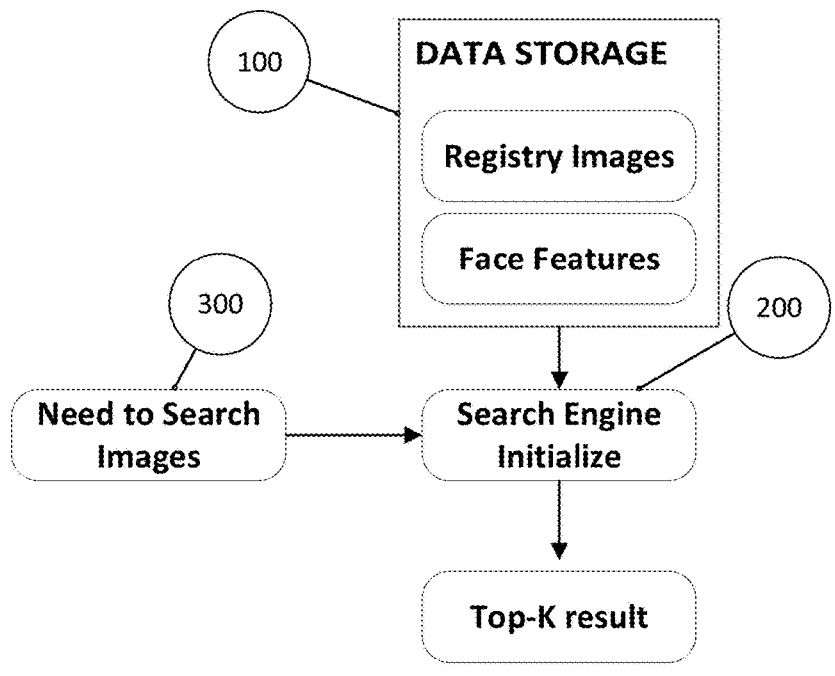
FIG. 1 describes the overall process of implementing the high-speed search matching method with a large-scale heterogeneous database proposed in the invention.

Referring to FIG. 1, the storage and search process includes three major processing stages, namely:

the process of extracting and storing the user's registered image features, forming a database, and being a reference when matching and searching.

the process of initializing the search engine, in which two objects in the search engine are initialized, including the matching object, calculating the distance, and the data table object to determine the target search object for each input image sample.

the process of matching and searching for objects, including the process of calculating the distance between the features and determining the target array, finally comparing and giving the final result.

Accordingly, the process of extracting and storing features is performed as follows.

Figure 2:
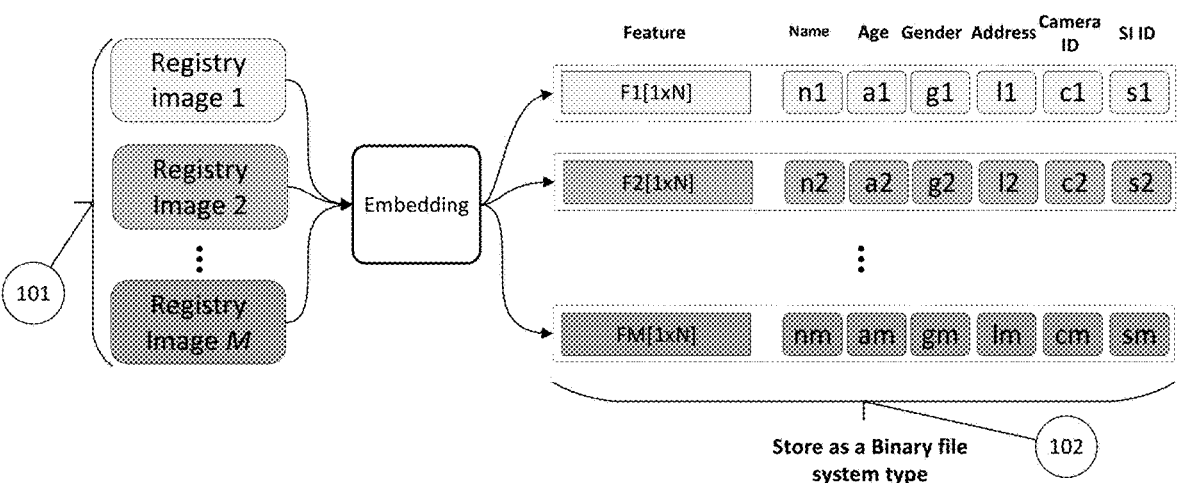
FIG. 2 describes the process of extracting features and storing the database of image samples used for registration to identify the object.

Referring to FIG. 2, this process includes two steps:

Image 101 is used to initialize the database of users registered through the operating partner's channel (using cloud computing services to deploy solutions for end users). When registering an object image, the process of extracting features and updating accompanying information is described as follows:

For images, the object used for identification can be a face, human shape or vehicle, this image object is fed into a pre-trained deep learning model to extract features, this feature is a vector with 32-bit floating point format.

The accompanying information is determined when the server receives a request to update the database from the operating partner, the required information includes: operating partner identifier; user identifier; search group; and object label.

These information fields all use character format, in which the operating partner code is a character string identifying the unit (or individual) issuing the cloud computing service for object identification. This operating code is issued by the developer, cloud computing service provider to the service issuing unit.

The user identification code is a character string identifying the end user, who is directly using the cloud computing object identification service issued by a certain operating partner. The user identification code is issued by the service issuing unit to the user, after registration and approval.

The object search group is described as a character string representing different marked data arrays of the same user, used in cases where the service user needs to fragment the data at different camera installation locations, such as Apartment No. 1, Apartment No. 2, etc. The search group is self-defined by the user, selected when initializing and updating the database.

The object label is a character string identifying the object, which can be the full name, or any character code, as long as the samples of the same object have the same label. The object label is self-defined by the user (or can be through the service provider's encryption channel), sent when registering a new photo for the object to be identified.

Figure 3:
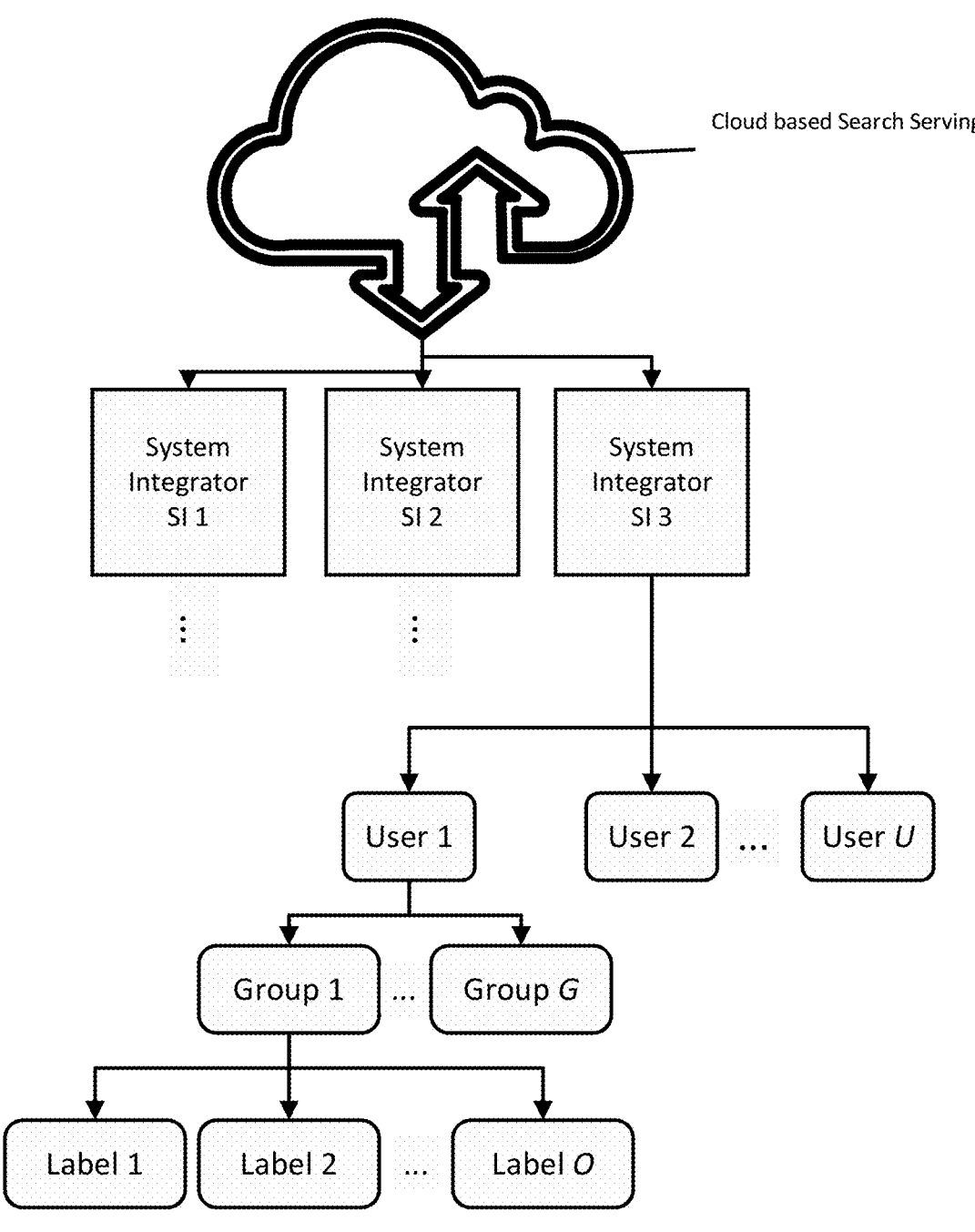
FIG. 3 describes an example of the relationship between (1) the operating partner identifier; (2) the user identifier; (3) the search group, and the method of using the cloud search service.

The relationship between cloud computing→operating partner→user→search group→object to be identified is described in FIG. 3.

Deep learning features and accompanying information of the image object are registered in the database stored at 102. The data is stored in a fragmented structure, in other words, each image entered for registration will store a corresponding binary file. In that binary file, both image features and accompanying information are included in the form of a dictionary object. These files are stored like other physical files, in a pre-defined folder on the computer hard drive. Storing by binary files will help the system read the data as quickly as possible, while still preserving the format of the data. When initializing the search engine, it will first read these binary files, as a premise for the search process.

Figure 4:
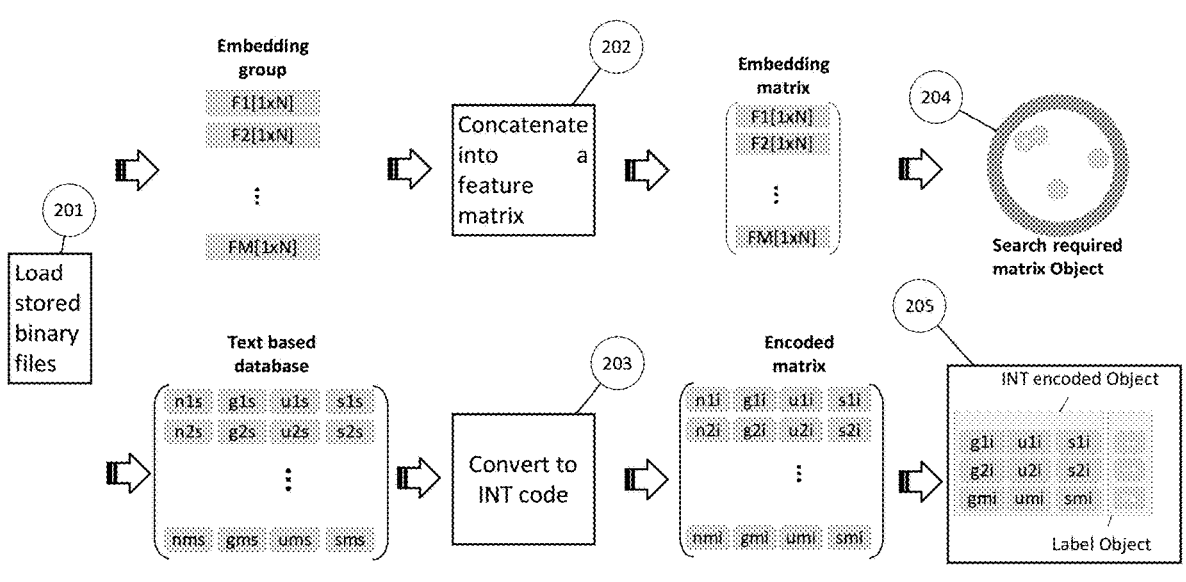
FIG. 4 describes the process of initializing the search engine.

The initialization process of the search engine is as follows:

Referring to FIG. 4, the initialization of the search engine starts with reading the binary file from 201 in the database. The dictionary-format data is read from the binary file, with the deep learning features of the image and the accompanying information, at this time these two types of information are still attached together in an object (dictionary). Then, using simplified operators, the key and value parts of the dictionary can be separated for separate processing.

For the deep learning features of the image, the vectors are concatenated together in order from top to bottom to form an array at 202. With a database with the dimension of the feature is 1×N, and there are M initialized image samples, the array created has a size of M×N. This process is quite simple, simply loading the features into the computer memory in an array.

For the accompanying information, it is being stored as a character string for each information field. This information is also assembled as for the image feature at 203, however, unlike the array format, the accompanying information is put into a table-like data object, for convenience in the process of retrieval and querying.

However, for character string data, the query speed is quite slow, which will affect the overall performance of the entire system. Therefore, in this invention, a method is proposed to convert the identifier codes in character strings to integer form, specifically described in FIG. 5.

Figure 5:
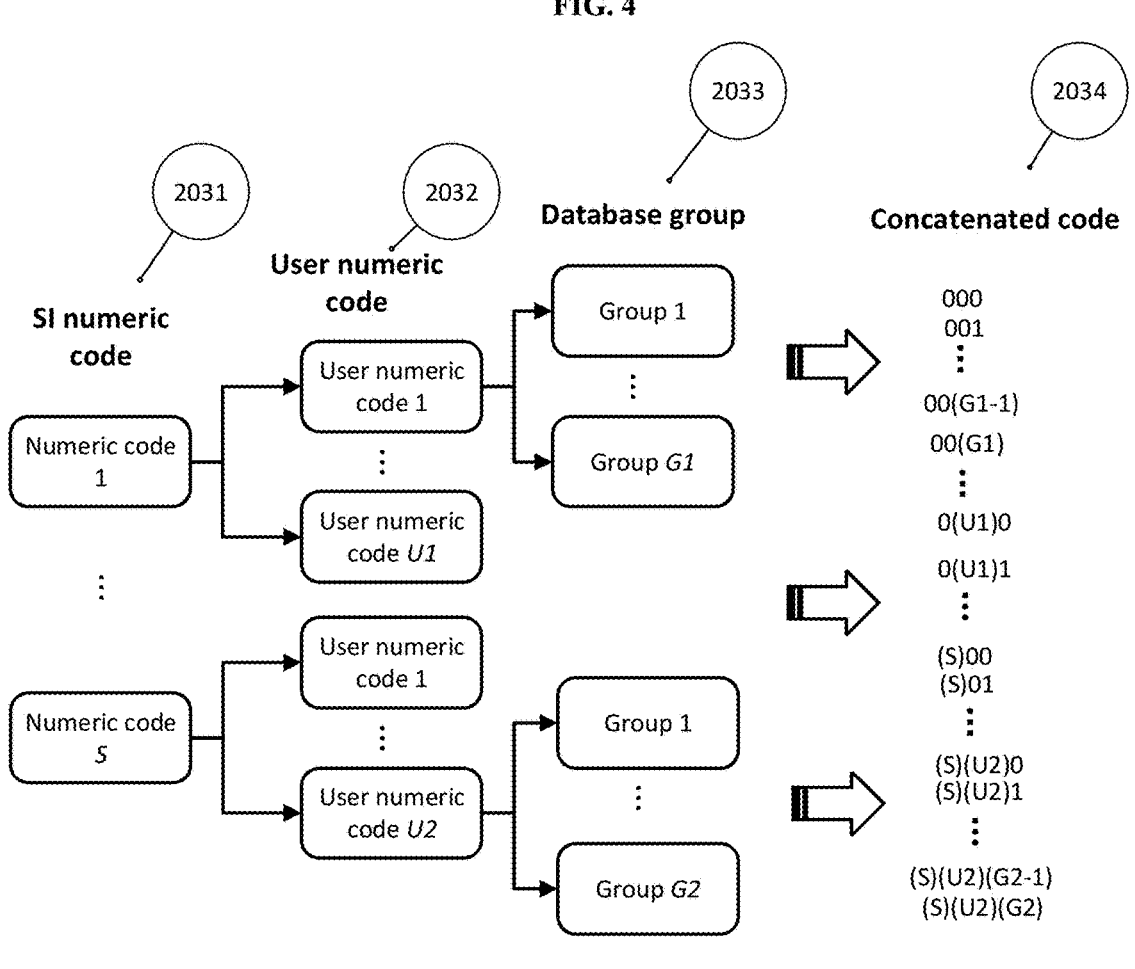
FIG. 5 describes an example of encoding the search group identifier from the character string format to the integer format.
Figure 6:
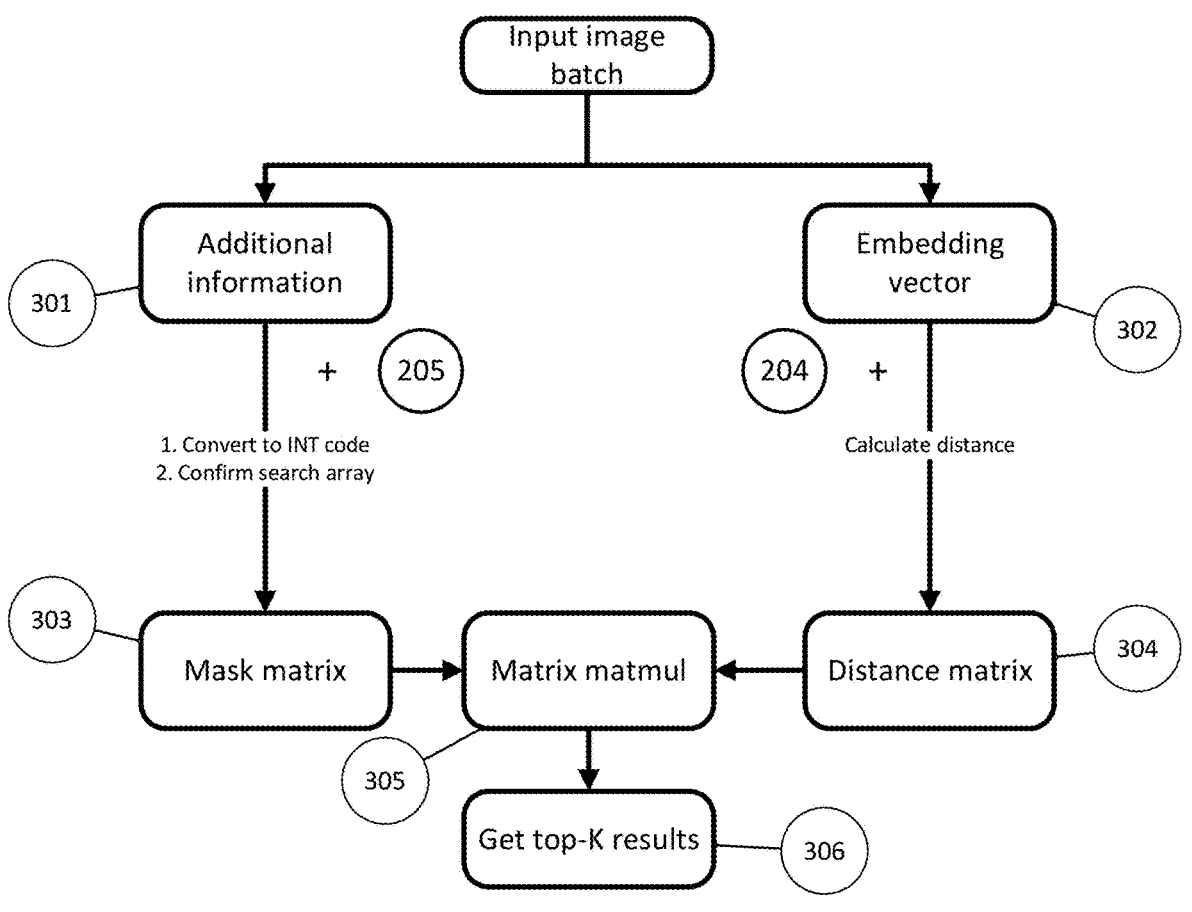
FIG. 6 describes the matching and identification process of the image sample to be identified through the search engine.

FIG. 5 shows the process of encoding the identifier character string into integer format. In this process, instead of using the character string directly, the position (index) of that identifier character string in the entire operating partner code/user code/database group is used, starting from 0 and ending at (total number of character strings−1), and converted in order from operating partner code 2031→user code 2032→database group 2033. For example, when converting the operating partner code, if the total number of operating partners includes ["si001", "si010", "si101", "si200"], then for the operating partner code "si010" will be converted to 1. In this way, the above identifier types have been converted, the full integer set for each data sample has the same number of elements as the number of code types, equal to 3 2024.

The final result of the search engine initialization process are 03 objects storing different information, serving the purpose of matching and searching.

In which, at 204, the array with size M×N, is loaded into the data processing blocks according to available tools such as numpy (for processing on CPU microprocessors) or cupy (for processing on GPU graphics microprocessors) to perform queries or matrix calculation operators quickly and efficiently.

In addition, according to 205, the accompanying information is first separated and encoded into integers (with 03 types of identifying information), then separated into two objects, the first is the attached information data table object and the second is the object storing the database label string.

The matching and searching process is performed as follows:

When operating the real-time object recognition system, the captured image samples are searched according to 300. First, these images which need to be identified are analyzed into two data streams, which are from 301, the deep learning features of the object image (the model is synchronized with 100), and from 302, determines the search identification code group, including the operating partner code, user code and database group. This search identification code information is then converted to integer form with the same principle as in 203.

Due to some features of the search system as follows:

The image samples that need to be matched are not uniform in terms of the operating partner code, user code or database group that needs to be searched. In addition, this information is completely random in order when receiving processing requests from cameras in the field.

To make the most of the computer's matrix computing capabilities, the entire database is registered and initialized as a block array with different search array identification information groups.

As a result, the image sample to be searched cannot use the matching result (calculating the distance between vectors) on the entire database as a final search result, but the effective calculation result is the vector distances in each different search group (for each time, each image group needs to identify the object). Any image sample will only be selected for identification search within the scope of the operating partner code, user code and certain database group. In this process, although the database contains all the information for registering the object identification service, there will be no possibility of misidentification errors, such as mistaking a person in Apartment A for a person registered in Apartment B.

With such processing idea, at 303, the samples to be identified need to determine the search array (in the overall database). In this process, the search identification code information of the group of images to be identified is compared with the data from accompanying information data table of the database to determine the search array of each sample in the above group of images. Specifically, the search identification code of each sample is compared with the integer code of the database, to find the data sequence numbers to match. Let M be the size of the database, the database's integer code is a matrix R of size (M×3), and with X image samples to be searched at the same time, the corresponding integer code is T of size (X×3), then the marking matrix $\Psi$ has size (M×X), with values of only 0 or 1. In which, at coordinates (m,x) with value 0 indicates that the database's denominator m is not within the search range of the $x^{th}$ sample of the search group, and vice versa. The formula for determining the array:

$$\Psi(m, x) = \begin{cases} 0 \text{ if } M(m, :) \neq X(x, :) \\ \qquad 1 \text{ others} \end{cases}$$

Figure 7:
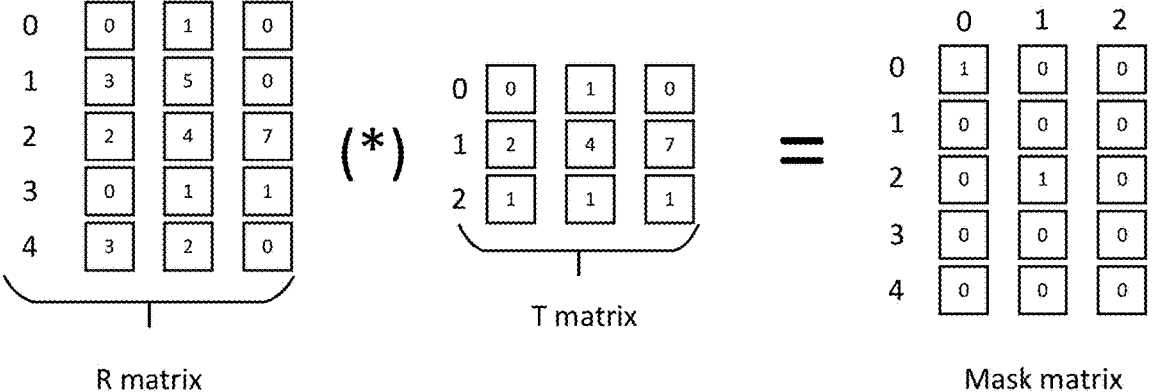
FIG. 7 describes an example of the target array filtering process for each image sample to be recognized.

At this time, the matrix marked with values 0 and 1 will determine the search range of each image sample to be recognized, representing the search range of each image sample is a vector with length 1×M, the position with value 1 is the serial number of the data to be compared, the example is described as in FIG. 7.

At the same time, at 304, the feature group from 302 is put into the search matching object 204 to calculate the distance, here, the distance between two vectors is calculated using the cosine formula, the larger the cosine distance value, the higher the similarity between the two vectors. In the process of calculating the distance, use the operators to process on the data array (processing in blocks), with high calculation speed, especially when used on GPU. Specifically, the distance matrix distance(m,x) is calculated according to the formula:

$$\text{distance}(m, x) = \text{dot}\big(f(M, :N), g(X, N)\big)$$

In which, f(M,:N) and g(X,N) are the feature matrix objects of the database and the image samples to be recognized, respectively, with N being the dimension of the feature vector.

Next, to eliminate incorrect matches, use the marker matrix to determine the usable distance values for each sample to be recognized, at 305, the unusable distance matrix values are set to 0 by the multiplication between the two distance matrices and the marker matrix, specifically:

$$\text{distance}'(m, x) = matmul(\text{distance}(m, x), \Psi(m, x))$$

According to each column of distance'(m,x), the higher the value of the element, the more it matches the corresponding sample to be recognized, according to the order number. Therefore, to get the K most matching data samples (with K set in advance), arrange the values from large to small, at 306, you will get the order number indices (k=1→K) and the corresponding distance value corr (k=1→K) of those K most matching samples:

$$\text{indices}(k) = argsort(\text{distance}')[:K]$$
$$corr(k) = \text{sort}(\text{distance}')[:K]$$

And the label of these matching data samples label(k) is determined by:

$$\text{label}(k) = L(\text{indices})$$

With L being the object storing the data label string identified at 205.

At the end of the search process, the system returns the final result including label(k) and corr(k) to the server address that issued the request for identification.

Example of Implementing the Invention

The method proposed in this invention is widely applicable to object recognition problems, such as face recognition, human shape recognition, fingerprint recognition, or for vehicle re-identification problems, as well as other object recognition problems.

For the face recognition problem, some experiments have been performed and analyzed for effectiveness, specifically with the following experimental environment:

Data scale of 10000 samples, initialized as described in the invention, with deep learning features and deep learning information stored in binary files.

The number of search group combinations (operator code+user identifier+search group) is up to 20.

The number of simultaneous search patterns is 100, with completely random search group combinations, and it is guaranteed that these combinations all exist in the database.

The dimensionality of the feature vector is 512, with 32-bit floating point format.

Running on a NVIDIA 3070Ti GPU.

For each search, performing one million simultaneous matches, the average time for each match (from feature extraction to the final result) is 30 microseconds with completely accurate match results (100%). This result has similar accuracy but much faster performance than tools with similar features (on the same experimental conditions), with each match taking an average of 15 milliseconds.

Benefits (Effectiveness that can be Achieved by the Invention)

The method mentioned in the invention has been used in artificial intelligence and computer vision solutions, serving building security monitoring products, public security monitoring, and large-area object search of Viettel High Technology Industries Corporation.

In particular, this method is a core technology in cloud computing service products with services operating using live data from cameras, returning calculation results in real time. In which, the services which have been deployed are face recognition, human shape recognition, vehicle recognition, and large-area object search.

The proposed method has very high performance, taking advantage of the parallel computing capability of the deployed infrastructure with a block-based processing method combined with a marker matrix. Experimental results and field implementation results (in products) have shown the superiority in accuracy and response time of the search method.

The invention claimed is:

1. A high-speed search matching method with a large-scale heterogeneous database, the method includes three processes performed in turn, including:

a registration image processing process: used to extract the features of the object including a face, or a human shape, a vehicle and update, store into the large-scale heterogeneous database according to a fragmented structure of rows and columns; accordingly, an image used to initialize the database of users is registered through the channel of an operating partner using cloud computing services to deploy solutions for end users, used for the object recognition problem;

a search engine initialization process: perform a database reading process, including loading feature data and accompanying information, and packaging the feature data and accompanying information into two objects, the first object is a matrix matching object and the second object is a data table object; these two objects constitute a search engine, and perform the tasks of identifying a target data array as well as determining a distance between image features to be searched and a feature matrix of the available database; this process includes:

reading and extracting information from a binary file, loading the data which is the deep learning features and accompanying information from the pre-specified database;

creating a matching and searching object: the matching and searching object is created by a process of stringing together deep learning features of all the samples in the database from top to bottom into a unified array; this feature array is loaded into a numpy object for parallel processing in blocks on a CPU and into a cupy object for parallel processing in blocks on a graphics microprocessors (GPU);

creating an object-label data table object: created after extracting the accompanying information with a "key: value" method of the dictionary, the object label is stringified into a table object, with an order number synchronized with a position of the deep learning feature array;

create an accompanying information data table object: separated and synchronized with the label data table after separating the accompanying information with the "key: value" method;

a search process search engine operators cluster: includes a process of extracting features from the image that needs to be matched for search and performing the query, comparing with the available database, finding the most matching data samples with a smallest distance, this process includes:

extracting information from the images that need to be identified: the information is analyzed into two data streams: deep learning features of the object image the model synchronizes with the deep learning model when creating the database and determining a search identification code group, including an operating partner code, user code and database group;

determine a search target of each image sample in the group to be identified: a search identification code information of the image group to be identified is compared with the accompanying information data table data of the database to determine a search array of each image sample in the above image group; specifically, the search identification code of each sample is compared with the integer code of the database, to find the data sequence numbers that need to be matched; let M be the scale of the database, the integer code of the database is the matrix R with size (M×3), besides, with X image samples to be searched simultaneously, the corresponding integer code is T with size (X×3), then the marking matrix $\Psi$ has size (M×X), with values of only 0 or 1; in which, at coordinates (m,x), a value of 0 indicates that the database's denominator m is not within the search range of the $x^{th}$ sample of the search group, and vice versa; method of determining the array:

$$\Psi(m, x) = \begin{cases} 0 \text{ if } M(m, :) \neq X(x, :) \\ 1 \text{ others} \end{cases},$$

At this time, the marking matrix with values 0 and 1 will determine the search range of each image sample to be recognized, representing the search range of each image sample is a vector with length 1×M, the position with value 1 is the sequence number of the data to be compared;

calculate a distance between the feature of image group to be recognized and the matching and searching object; determine the group of effective distance values for each image sample to be recognized, specifically: the group of features from the image group to be recognized is put into the matching and searching object to calculate the distance by using a cosine formula to calculate a distance between two vectors, the larger the value of cosine distance, the higher the similarity between the two vectors; in the process of calculating the distance, use operators to process on the data array block processing, with high calculation speed, especially when used on GPU; specifically, the distance matrix distance(m,x) is defined: distance(m,x)=dot(f(M,:N),g(X,N)), in there, f(M,:N) vàg(X,N) are the feature matrix objects of the database and the image samples to be recognized, respectively, with N being the dimension of the feature vector; from the distance calculation results and the marker matrix, filter the matching results and present the final recognition result;

finally, based on the effective distance value, sort and get the corresponding label position and return the final result, specifically:

first, remove the incorrect matching results, use the marker matrix to determine the usable distance values for each sample to be recognized, the unusable distance matrix values are set to 0 by the multiplication between the two distance matrices and the marker matrix, specifically: distance'(m, x)=matmul(distance(m,x),Ψ(m,x));

according to each column of distance'(m,x), the higher the value of the element, the more it matches the corresponding sample to be recognized, according to the order number; to get the K most matching data samples with K set in advance, arrange the values from large to small, will return the order number indices (k=1→K) and the corresponding distance value corr(k=1→K) of those K most matching samples:

$$indices(k) = argsort(\text{distance}')[:K]$$

$$corr(k) = sort(\text{distance}')[:K]$$

and the labels of these matching data sample label(k) are determined by:

$$label(k) = L(\text{indices})$$

with L being the object storing the data label string determined from the initialization of the search engine; finally, at the end of the search process, returning the results.

2. The method of high-speed search matching with the large-scale heterogeneous database according to claim 1, in which the information to be determined during the registration image processing process includes:

for the image, the object used for identification can be a face, a human figure or a vehicle, this image object is fed into a pre-trained deep learning model to extract features, this feature is a vector with 32-bit floating point format;

the accompanying information is determined when the server receives a database update request from the operating partner, the required information includes: an operating partner identifier; a user identifier; a search group; and an object label;

the operating partner identifier is a character string identifying the unit or individual issuing the cloud computing service for object recognition; this operating partner identifier is issued by a developer or cloud computing service provider to the service issuer;

The user identifier is a character string identifying the end user, who is directly using the cloud computing object recognition service issued by a certain operating partner; the user identifier is issued by a service issuer to the user, after registration and verification;

an object search group is described as a character string representing different marked data arrays of the same user, used in cases where the service user needs to fragment the data at different locations where identification cameras are installed; the object search group is self-defined by the user, selected when initializing and updating the database;

an object label is a character string identifying the object, which can be a full name, or any character code, as long as samples of the same object have a same label; the object label is self-defined by the user or can be through the service provider's encryption channel, sent when registering a new image for the object to be identified.

3. The high-speed search matching method with the large-scale heterogeneous database according to claim 1, in which the information in the process of processing the registered image is stored as follows:

information from each registered image sample is forced into a dictionary format;

information after extraction is stored as a binary file; these files are stored like other physical files, in a pre-defined folder on a computer hard drive.

4. The high-speed search matching method with the large-scale heterogeneous database according to claim 1, wherein during the initialization of the search engine, the accompanying information data table is encoded into an integer format instead of a character string, in which the identifier character is converted into an integer format, specifically: instead of directly using the character string, the position (index) of that identifier character string in the entire operating partner code/user code/database group is used, starting from 0 and ending with total number of character strings−1, and converted in an order from operating partner code→user code→database group.

5. The high-speed search matching method with the large-scale heterogeneous database according to claim 2, in which the information in the process of processing the registered image is stored as follows:

information from each registered image sample is forced into a dictionary format;

information after extraction is stored as a binary file; these files are stored like other physical files, in a pre-defined folder on a computer hard drive.

6. The high-speed search matching method with the large-scale heterogeneous database according to claim 2, wherein during the initialization of the search engine, the accompanying information data table is encoded into an integer format instead of a character string, in which the identifier character is converted into an integer format, specifically: instead of directly using the character string, the position (index) of that identifier character string in the entire operating partner code/user code/database group is used, starting from 0 and ending with total number of character strings−1, and converted in an order from operating partner code→user code→database group.

7. The high-speed search matching method with the large-scale heterogeneous database according to claim 3, wherein during the initialization of the search engine, the accompanying information data table is encoded into an integer format instead of a character string, in which the identifier character is converted into an integer format, specifically: instead of directly using the character string, the position (index) of that identifier character string in the entire operating partner code/user code/database group is used, starting from 0 and ending with total number of character strings–1, and converted in an order from operating partner code→user code→database group.

8. The high-speed search matching method with the large-scale heterogeneous database according to claim 5, wherein during the initialization of the search engine, the accompanying information data table is encoded into an integer format instead of a character string, in which the identifier character is converted into an integer format, specifically: instead of directly using the character string, the position (index) of that identifier character string in the entire operating partner code/user code/database group is used, starting from 0 and ending with (total number of character strings–1), and converted in an order from operating partner code→user code→database group.

* * * * *